United States Patent
Bailey et al.

(10) Patent No.: US 6,925,451 B1
(45) Date of Patent: Aug. 2, 2005

(54) MAIL RECEIPT TERMINAL HAVING DEPOSIT TRACKING CAPABILITY

(75) Inventors: William F. Bailey, Guilford, CT (US); Michael J. Shukaitis, Waterbury, CT (US)

(73) Assignee: Pitney Bowes Inc., Stamford, CT (US)

(*) Notice: Subject to any disclaimer, the term of this patent is extended or adjusted under 35 U.S.C. 154(b) by 795 days.

(21) Appl. No.: 09/645,398

(22) Filed: Aug. 24, 2000

(51) Int. Cl.[7] .............................................. G06F 17/60
(52) U.S. Cl. ......................... 705/410; 705/62; 705/44; 235/375
(58) Field of Search ................................ 705/410, 401, 705/411, 60, 62, 40, 44, 408, 404, 406; 235/375

(56) References Cited

U.S. PATENT DOCUMENTS

| | | | |
|---|---|---|---|
| 5,369,258 A | 11/1994 | Sansone et al. ............. | 235/381 |
| 5,457,636 A | 10/1995 | Sansone et al. ............. | 364/478 |
| 5,586,036 A | 12/1996 | Pintsov ................. | 364/464.02 |
| 5,826,247 A | 10/1998 | Pintsov ...................... | 705/404 |
| 5,909,373 A | 6/1999 | Sansone et al. ........ | 364/479.08 |
| 5,970,150 A | 10/1999 | Sansone et al. ............... | 380/51 |
| 6,175,827 B1 * | 1/2001 | Cordery et al. ............. | 705/410 |

FOREIGN PATENT DOCUMENTS

JP          10-81321 A    *    3/1998

OTHER PUBLICATIONS

Milo Nelson, "The USPS may rise again", Jan. 1993, Computers in LIbraries, v13, n1, p30(4).*

Unknown author, "United States Postal Service to Install Wincor Nixdorft Self–service Units at over 2,300 Postal Locations", Aug. 2004, Business Wire, T14:11:00Z, 2 pages.*

* cited by examiner

Primary Examiner—Dean T. Nguyen
Assistant Examiner—Richard Woo
(74) Attorney, Agent, or Firm—Angelo N. Chaclas; Martin F. Noonan

(57) ABSTRACT

A mail receipt terminal for accepting an envelope having evidence of postage applied thereto. The mail receipt terminal includes a controller module and an input scanner module and a printer module, both in operative communication with the controller module. The controller module includes a control system and a clock module. The input scanner module: (i) receives the envelope, (ii) scans the evidence of postage to determine its veracity, and (iii) rejects the envelope if the evidence of postage is determined to be improper. If the evidence of postage is determined to be proper, then the printer module prints a receipt including data thereon corresponding to the envelope where the receipt data includes a date/time stamp and an ID tracking number that uniquely corresponds to the envelope.

10 Claims, 5 Drawing Sheets

FIG. 3
(PRIOR ART)

MAIL RECEIPT TERMINAL HAVING DEPOSIT TRACKING CAPABILITY

FIELD OF THE INVENTION

This invention relates generally to postal systems. More particularly, in the preferred embodiments, this invention is directed to a postal system, a mail receipt terminal and methods for providing proof of deposit of a mail piece by a sender with the postal authority.

BACKGROUND OF THE INVENTION

When dispatching important communications (contracts, legal notices, deeds, etc.), the sender and recipient of a mail piece are both often very interested in knowing when the mail piece was deposited with the carrier for delivery and in tracking the progress of the mail piece until it is received by the recipient.

No matter what form of postage payment a sender utilizes, there exists no convenient way for the sender to receive proof that a particular mail piece was deposited with the postal authority on a given day. If the sender utilizes permit payment methods, then the date of deposit of the batch mailing with the postal authority will not confirm that a particular mail piece was contained with that batch. If the sender utilizes stamps, then the sender has even less proof of when the envelope was deposited. If the sender utilizes a postage meter, then the mail piece does contain a date on which the postage was applied to the mail piece. However, this does not necessarily correspond to the date when the mail piece was deposited for delivery because the sender may process the mail piece on one day and deposit it with the postal authority on another day.

On the other hand, the sender may visit the post office window and make payment for first class postage, deposit the mail piece with the postal authority and request a receipt from the post office window clerk. However, this receipt will only evidence that a given amount of postage was dispensed on a given date. There is no relationship between the postage, the date and the recipient. As an added option, the sender may request special services, such as: certified mail delivery, priority mail or the like. In this instance, a unique identification number is issued by the postal authority, typically by placing it on the certified mail label or the priority mail label (as shown in FIGS. 2 and 3, respectively), and the sender must fill out additional paper work (the label) and pay a premium for these special services. In this case, the sender does receive a receipt that corresponds to a particular mail piece. However, this process is: (i) time consuming for both the sender and the postal authority; (ii) costly for both the sender and the postal authority; and (iii) only available during the postal authority's normal working hours.

Therefore, there is a need for a more cost effective and efficient system for providing senders with proof of deposit of a mail piece with the postal authority.

SUMMARY OF THE INVENTION

The present invention provides a mail receipt terminal, a method of operating a postal system and a postal receipt. Generally, this is accomplished by generating a unique ID tracking number and controlling the acceptance of an envelope prior to printing a receipt that corresponds to the envelope.

In accordance with the present invention, there is provided a mail receipt terminal for accepting an envelope having evidence of postage applied thereto. The mail receipt terminal includes a controller module and an input scanner module and a printer module, both in operative communication with the controller module. The controller module includes a control system and a clock module. The input scanner module: (i) receives the envelope, (ii) scans the evidence of postage to determine its veracity, and (iii) rejects the envelope if the evidence of postage is determined to be improper. If the evidence of postage is determined to be proper, then the printer module prints a receipt including data thereon corresponding to the envelope where the receipt data includes a date/time stamp and an ID tracking number that uniquely corresponds to the envelope.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 3 is an example of a priority mail label that exists in the prior art.

DETAILED DESCRIPTION OF THE PREFERRED EMBODIMENTS

Figure 1:
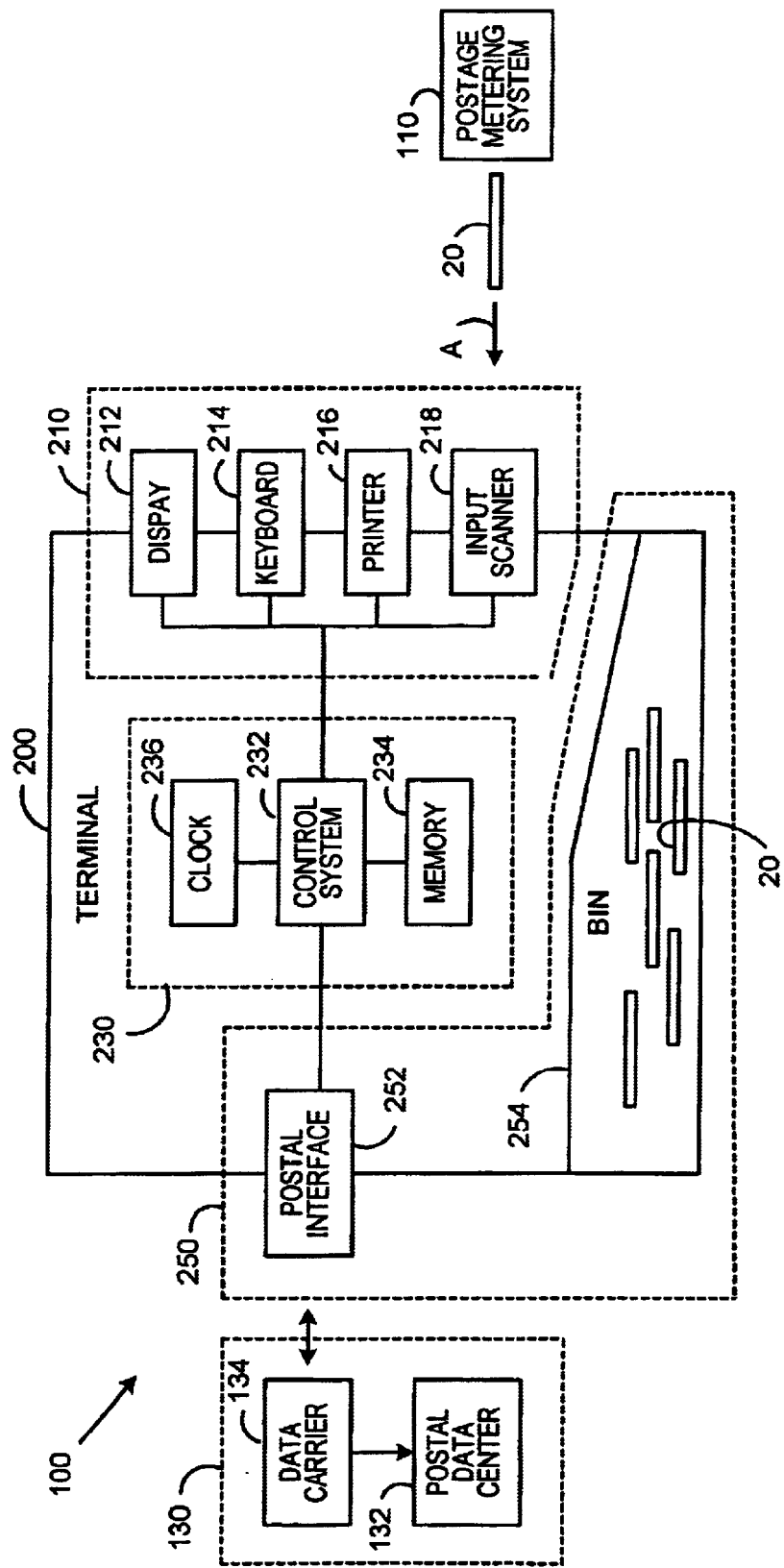
FIG. 1 is a simplified diagrammatic representation of a postal system in accordance with the present invention.

Referring to FIG. 1, a postal system 100 including a postage metering system 110, a postal authority data processing system 130 and a terminal 200 for receiving an envelope 20 is shown. As described herein, the term envelope 20 is intended to include any type of mail piece, such as: envelopes, post cards, packages and the like. Since postage metering systems 110 are well known in the art, their description will be limited to that which is necessary for an understanding of the present invention. Accordingly, the postage metering system 110 includes a computer device (not shown) and a printer (not shown) and may generally be based on any conventional postage metering platform, such as the ClickStamp® Online postage metering system or the PostPerfect® meter, both available from Pitney Bowes Inc. of Stamford, Connecticut. Similarly, the postal authority data processing system 130 is also well known in the art and its description will be limited to that which is necessary for an understanding of the present invention The terminal 200 acts as a repository for accepting envelopes 20 as they are deposited with the postal authority for delivery. The terminal 200 may be located remotely (street corner, shopping mall, university student center, etc.) at any convenient location or even in the post office lobby for use during off hours. The postal authority data processing system 130 includes a data center 132 and a portable data carrier 134 that collects data from the terminal 200 and passes it to the data center 132.

The terminal 200 includes customer facing elements 210, a controller 230 and postal service elements 250. The customer facing elements 210 provide an interface to the customer so as to make the terminal 200 a self-service experience for the customer. The postal service elements 250 are intended to be utilized exclusively by the postal authority. The controller 230 is operatively coupled to the customer facing elements 210 and the postal service elements 250 and generally directs their behavior. The controller 230 may generally be of any conventional design, including a suitable combination of hardware, software and peripheral devices. The controller 230 includes a control system 232 operatively connected to a memory device 234 and a secure real time clock device 236. Additionally, the controller 230 is operatively connected to both the customer facing elements 210 and the postal service elements 250. The memory device 234 may be of any conventional type (hard disk, non-volatile memory, etc.) sufficient to store data collected by the customer facing elements 210. The secure real time clock 236 may also be of any conventional type sufficient to provide a reliable indication of the date and time to the controller 230 so that fear of tamper by someone with fraudulent intent is not a realistic consideration. Generally, the customer facing elements 210 are directed to receiving input from and communicating information to the customer. The customer facing elements 210 include a display 212, a keyboard 214, a printer 216 and an input scanner 218, all under the control of the control system 232. Here again, these components may be of any conventional design. The postal service elements 250 include a postal interface 252, in operative communication with the control system 232, and a bin 254 that collects and holds the envelopes 20 that have been inserted into the terminal 200 until they are retrieved by the postal authority.

Figure 2:
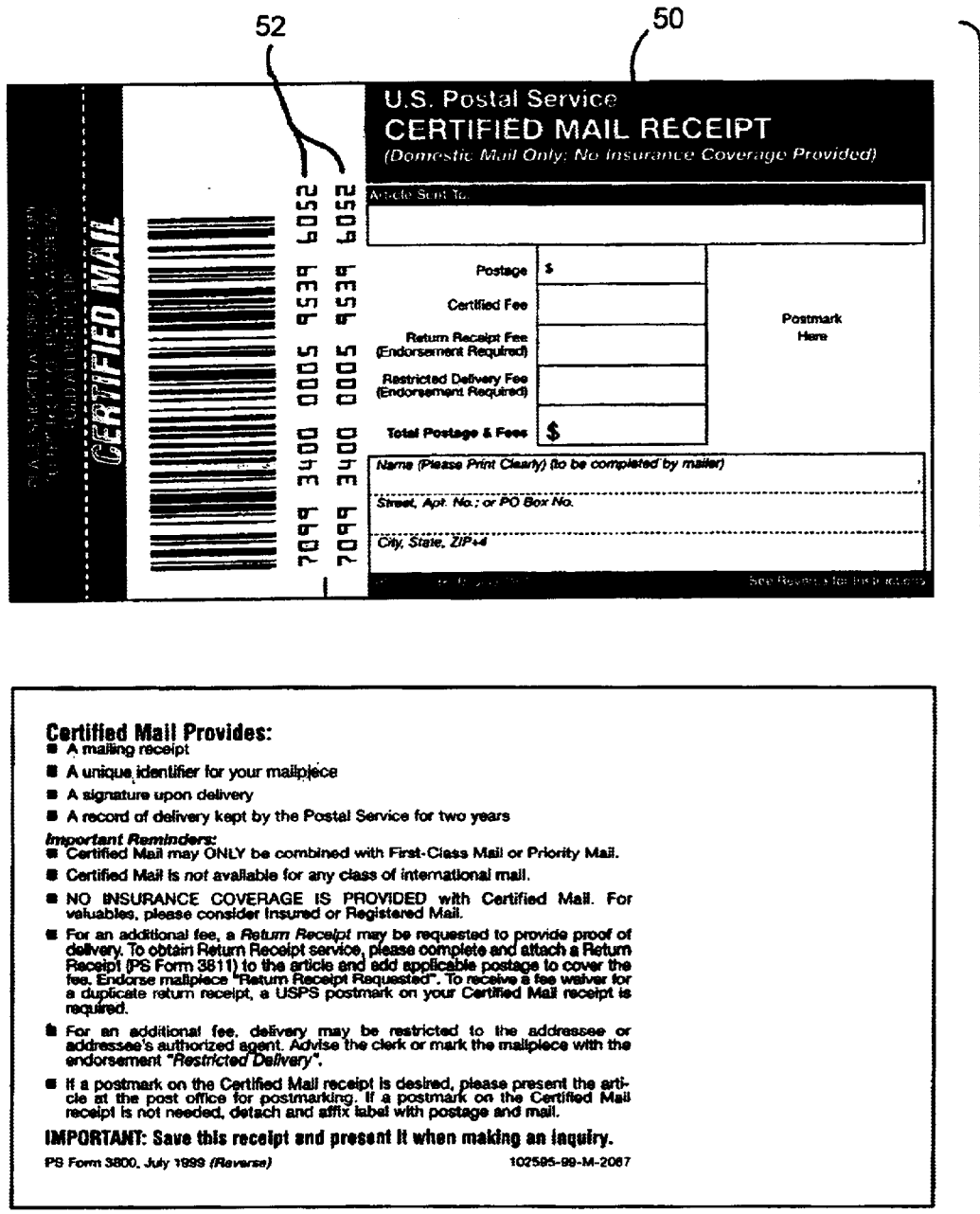
FIG. 2 is an example of a certified mail label that exists in the prior art.
Figure 3:
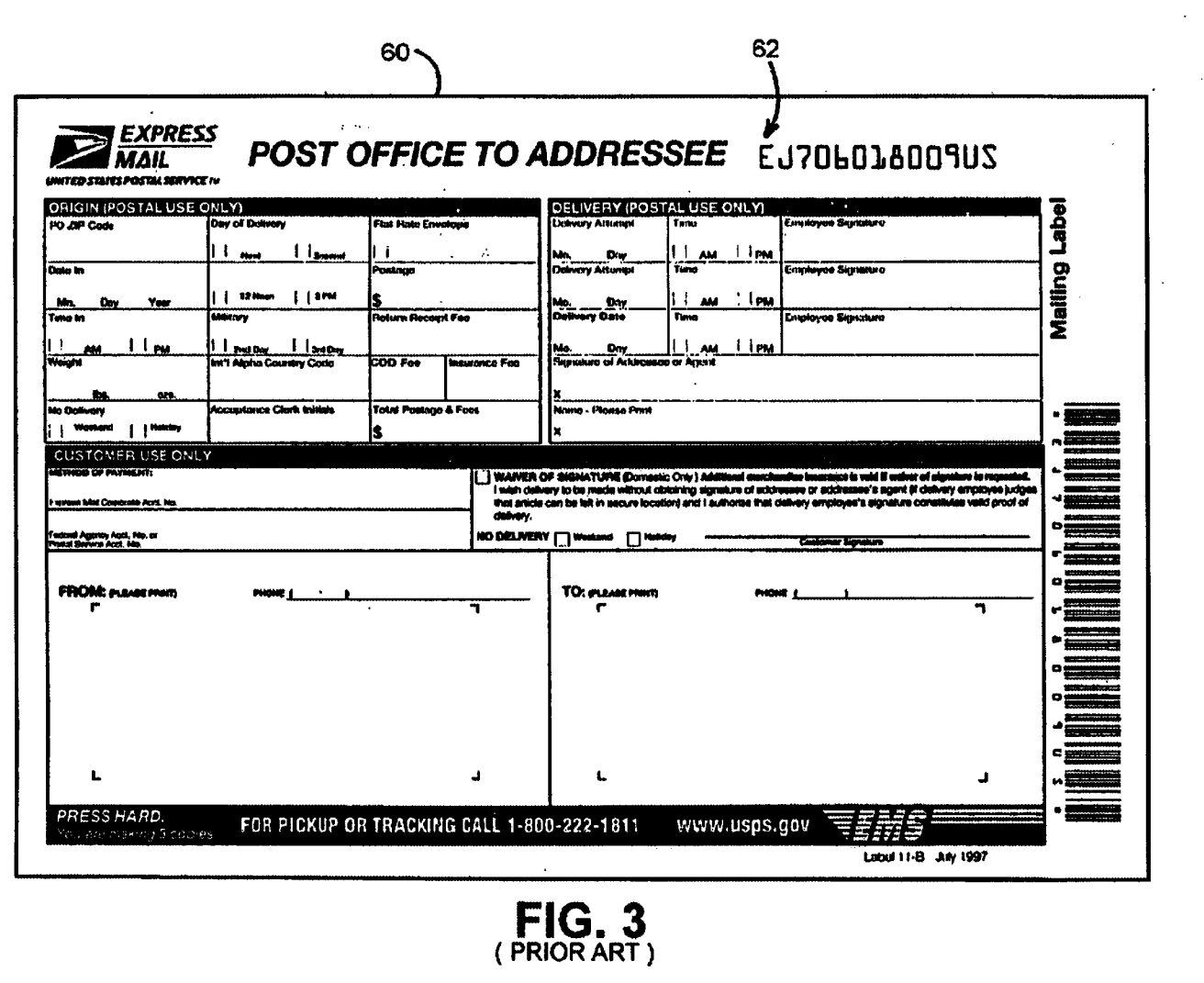

Referring to FIGS. 2 and 3 in view of FIG. 1, a certified mail label 50 and a priority mail label 60, both available in the prior art, are shown, respectively. As discussed above, these labels 50 and 60 are issued by the postal authority, cooperatively filled out by both the customer and the postal authority and are applied to the envelope 20. The certified mail label 50 includes an ID number 52, printed on both the postal authority portion and the customer portion of the label 50. Similarly, the express mail label 60 includes an ID number 62, printed on multi-page form so that both the customer and the postal authority may have record of it on their respective copies of the label. Both the postal authority and the customer use the ID numbers 52 and 62, respectively, for tracking purposes.

Figure 4:
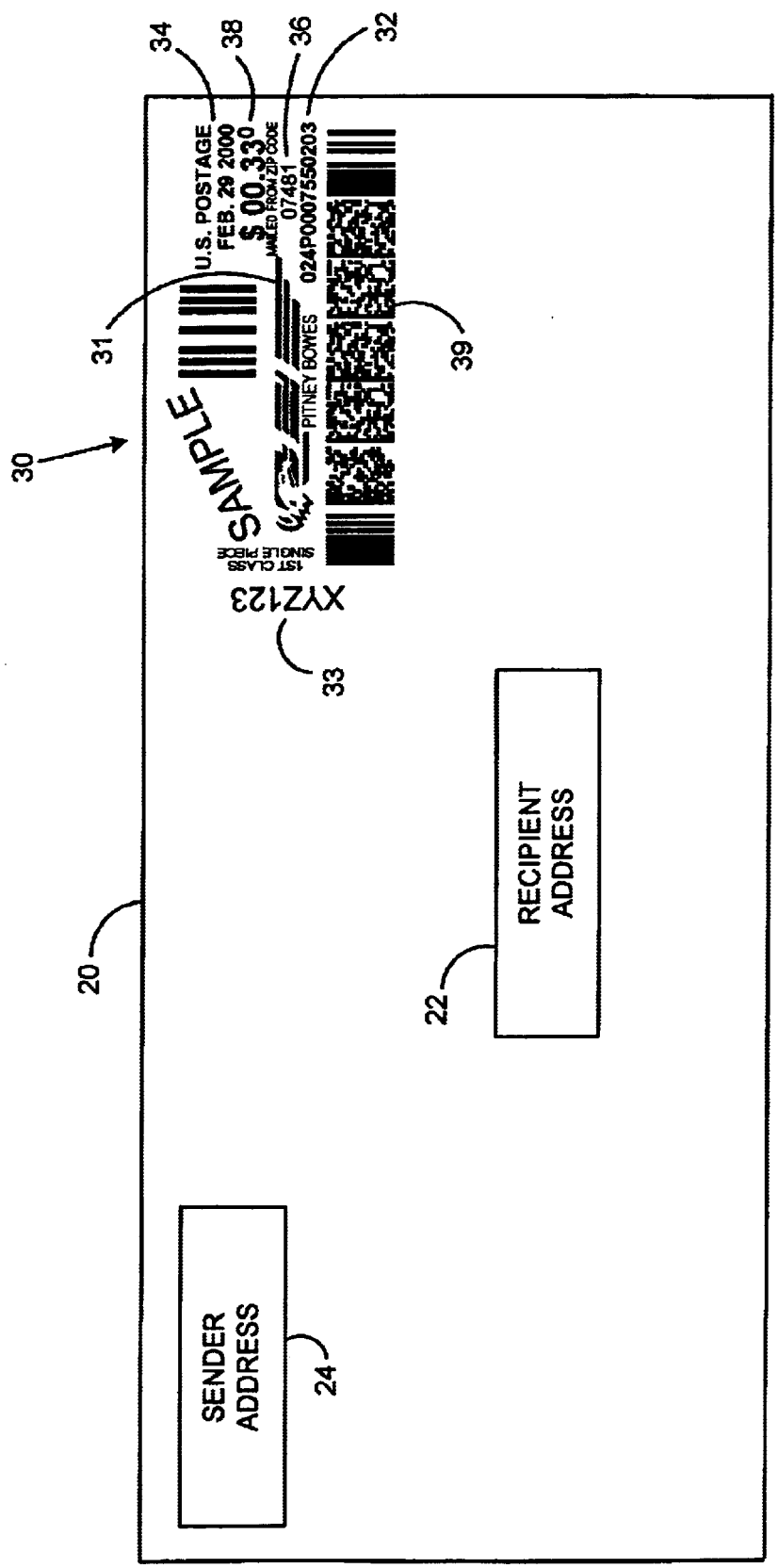
FIG. 4 is an example of an envelope processed in accordance with the present invention is shown.

Referring to FIG. 4 in view of FIG. 1, an envelope 20 processed by the postal metering 100 in accordance with the present invention is shown. The envelope 20 includes a recipient address 22, a sender address 24 and a postal indicia 30 printed thereon. The postal indicia 30 includes both fixed data that does not change from postal indicia to postal indicia and variable data that may change from postal indicia to postal indicia. Generally, the fixed data includes a graphic design 31 (an eagle), a meter serial number 32 uniquely identifying the postage meter (not shown) and a licensing post office identifier (zip code) 36. Generally, the variable data includes a date 34 indicating when the postage was dispensed, a postal value 38 indicating an amount of postage and verification data 39 (shown in the form of a 2D bar code) for use by the postal authority for verifying the authenticity of the postal indicia 30 using conventional techniques. The variable data also includes an ID tracking number 33 generated by the postal system 100 in response to a request from the customer. The ID number is preferably an alphanumeric number and may be printed on the envelope 20 in human readable format, machine readable format or both formats. However, those skilled in the art will recognize that the exact content of both the fixed data and variable data is subject to regulation of the postal authority and a matter of design choice.

Referring to FIGS. 1 and 4, in the most preferred embodiment, the postage metering system 110 is compliant with the Information-Based Indicia Program (IBIP) as defined by the United States Postal Service (USPS). The IBIP is intended to augment existing postage meters using new technology known as information-based indicia. The IBIP relies on digital signature techniques to produce for each mail piece a postal indicia 30 whose origin cannot be repudiated. The IBIP requires that, for each envelope 20, the recipient address 22 and the corresponding postage indicia 30 be generated and printed together and an integral unit. Thus, various input data, such as the recipient address 22, the date 34, the meter serial number 32 and the postage amount 38, are utilized by the postage metering system 110 to generate the verification data 39. This is to ensure that address cleansing is performed and that there is a one-to-one correspondence between the recipient address 22 and its associated postage indicia 30. As a result, the postage metering system 110 must print this unit on the actual envelope 20 or on label stock for later attachment to the envelope 20.

It should be understood that the verification data 39 is not unique to each envelope 20. Different combinations of the input data may yield the same verification data 39. That is, two different postage metering systems 110 with different serial numbers 32 on different days 34 applying different postage amounts 38 to envelopes 20 addressed to different recipient addresses 22 may yield the same verification data 39. However, the encryption algorithm that defines the verification data 39 is generally immune from attack.

Figure 5:
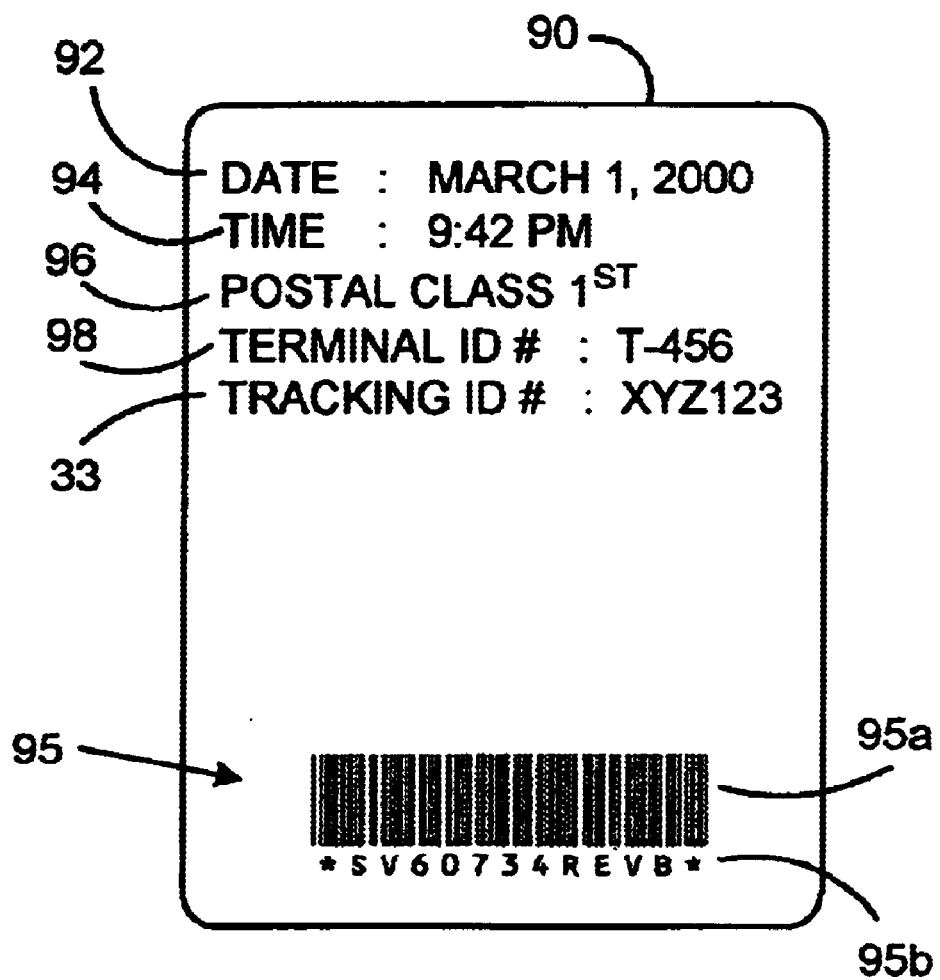
FIG. 5 is an envelope deposit customer receipt printed in accordance with the present invention

Referring to FIG. 5 in view of FIG. 1, an envelope deposit customer receipt 90 printed by the terminal in accordance with the present invention is shown. The receipt 90 is generated by the terminal 200 and printed by the printer 216 in response to receipt of the envelope 20 that has been properly verified by the control system 232 as containing a readable and authentic postal indicia 30 containing sufficient postage. The receipt 90 includes a deposit date 92, a deposit time 94, a postal class indicator 96, a terminal ID number 98 (optional), the ID tracking number 33 and an encoded representation 95 (optional) of the receipt data. The deposit date 92 and the deposit time 94 are obtained by the control system 232 from the clock 236. The terminal ID number 98 identifies a particular one of a plurality of remotely located terminals 200 that received the envelope 20. The postal class indicator and the ID tracking number 33 are obtained from the envelope 20 itself. The encoded representation 95 of the receipt data may be printed in both a machine readable format 95a, such as a bar code, and in human readable format, such as an alphanumeric string 95b. The encoded representation 95 may further employ cryptographic techniques to prevent tampering with the receipt data. As examples, the encoded representation 95 may be: (i) a hash of the receipt data; (ii) a digital signature based upon the receipt data; or (iii) some other manipulation of the receipt data utilizing techniques that are generally undiscoverable by the public.

Referring to FIGS. 1, 4 and 5, with the structural elements generally described as above, the operational aspects and additional details of the present invention in the most preferred embodiment will now be described in view of the life cycle of an envelope 20. For the sake of this discussion, it is assumed that the customer not only wants to mail the envelope 20, but also wants the receipt 90 or acknowledgement, from the postal authority that the envelope 20 has been received (deposited by the customer with sufficient postage).

The customer begins by utilizing the postage metering system 110 to process the envelope 20 and requests deposit tracking and feeds the envelope 20 through the postage metering system 110. The postage metering system 110 generates the ID tracking number 33 using conventional techniques and prints it on the envelope 20. Preferably, the ID tracking number 33 is unique to each mail piece and is derived from envelope data (the recipient address 22 and the postal indicia 30). Most preferably, the ID tracking number 33 is derived from the recipient address 22 and a sender identifier, such as the meter serial number 32. Although the tracking number 33 may be printed on the envelope 20 at any convenient time, it is preferably printed along with the postal indicia 30 and the recipient address 22 as part of the postage evidencing transaction so that any required payments may be accounted for at one time.

Once the envelope 20 is ready for deposit with the postal authority, the customer takes it to the terminal 200. Using the customer facing elements 210, the customer requests a receipt 90 and inserts the envelope 20 into the terminal 200 so that the envelope 20 passes through the input scanner 218. The input scanner 218 scans the recipient address 22 and the postal indicia 30 to determine the authenticity of the postal indicia 30. If the postal indicia 30 is found to be valid, then the receipt 90 is Issued by the terminal and a record of this transaction that is generally the same as the information contained in the receipt 90 is stored by the control system 232 In the memory device 234. The accepted envelope 20 is fed into the bin 254 where it waits to be collected by a postal authority representative. If the postal indicia 30 is deemed improper (not found valid), then the envelope 20 is rejected by the terminal 200 and returned to the customer.

On a periodic basis, the postal authority dispatches a representative to retrieve the envelopes 20 that have collected in the bin 254 and gather the records that have been stored in the memory device 234. The postal authority representative utilizes a portable data carrier 134 to retrieve the records. The portable data carrier 134 may be a smart card, a personal digital assistant or any other suitable device. The portable data carrier 134 communicates with the terminal 200 via the postal interface 250 (smart card reader/writer, infrared, docking connector, etc.) which is adapted to be compatible with the type of portable data carrier 134 being used. The portable data carrier 134 the further transmits the records to the postal data center 132 for use in tracking the envelope 20 and reporting back to the customer as to the status of the envelope 20.

Based on the above description and the associated drawings, it should now be apparent that the present invention improves many aspects of obtaining proof of deposit of an envelope 20 with the postal authority. Both the customer and the postal authority experience improvements in the overall efficiency and convenience of this postal system 100.

For example, the customer is not required to go to a post office window during normal working hours. As another example, the customer is not required to fill out any paperwork (forms). As yet another example, the postal authority does not have to print and distribute specialized forms (certified mail, priority mail, etc.). As yet still another example, the postal authority becomes more efficient because they do not have to supply as much service at the post office window and the ID tracking numbers 33 are issued and input into their system automatically. As a further example, the receipt 90 may be uniquely tied to various parameters of each specific envelope 20, such as: the recipient address 22, the date, the time, the customer (via the meter serial number 32), the class of service (first, priority, registered, etc.) and/or any combination of the above. Furthermore, the veracity of the receipt 90 is verifiable by a third party (the postal authority) in case a dispute arises between the customer and the recipient of the envelope 20. Still further, if there is a problem (readability - smearing of the image, fraudulent manipulation of the image, etc.) with the postal indicia 30 so that it may not be verified, then the customer knows this immediately. This saves the customer time since the envelope 20 does not have to be subsequently returned to the customer by the postal authority. This also saves the postal authority the expense of handling the envelope 20 only to have to return it to the customer. Those skilled in the art will likely recognize still other benefits of the present Invention.

Many features of the preferred embodiment represent design choices selected to best exploit the inventive concepts as implemented in an environment where the method of postage payment is by a postage meter. However, those skilled in the art will recognize that various modifications and adaptations can be made without departing from the spirit of the present invention. In other words, the present invention, as described above with respect to the most preferred embodiment, may be modified to provide additional capability. For example, if the customer chooses to use stamps to evidence postage payment, then the terminal 200 can be adapted to scan the stamps, verify them, cancel them and issue the ID tracking number 33. As another example, the terminal 200 in the postage metering system embodiment may also generate the issuance of the ID tracking number 33. As yet another example, the verification data 39 and the ID tracking number 33 could be combined into a single set of data. As yet still another example, the terminal 200 may be located in a more controlled environment, such as the post office lobby. In this instance, the need for the portable data carrier 134 and the postal interface 250 is obviated because the control system 232 may communicate directly with the data center 132. As a further example, the postage payment capability may be incorporated into the terminal 200. In this case, the customer facing elements 210 could accept payment (cash, credit card, debit card, etc.) and print evidence of postage payment on the envelope 20.

Therefore, the inventive concept in its broader aspects is not limited to the specific details of the preferred embodiments described above, but is defined by the appended claims and their equivalents.

What is claimed is:

1. A mail receipt terminal for accepting an envelope having evidence of postage applied thereto, the mail receipt terminal comprising:
   a controller module including a control system and a clock module;
   an input scanner module in operative communication with the controller module for: (i) receiving the envelope, (ii) scanning the evidence of postage to determine its veracity, and (iii) rejecting the envelope if the evidence of postage is determined to be improper;

a printer module in operative communication with the controller module for printing a receipt including data thereon corresponding to the envelope if the evidence of postage is determined to be proper;

a memory device in operative communication with the controller module for storing the receipt data;

the memory device transferring the receipt data to a postal interface; and a portable data carrier for transferring the receipt data from the postal interface to a postal data center; and wherein:

the receipt data includes a date/time stamp and ID tracking number that uniquely corresponds to the envelope.

2. The mail receipt terminal of claim 1, wherein:

the receipt data further includes a terminal ID number that uniquely corresponds to a particular terminal that issued the receipt where the particular terminal is one of a plurality of remotely distributed terminals.

3. The mail receipt terminal of claim 2, wherein:

the receipt data further includes an indicator of the class of service for the envelope.

4. The mail receipt terminal of claim 3, wherein:

the receipt further includes an encoded version of at least a portion of the receipt data.

5. A method of operating a postal system for receiving an envelope having evidence of postage applied thereto, the method comprising the step(s) of:

receiving the envelope at a mail deposit terminal;

scanning the evidence of postage to determine its veracity, rejecting the envelope if the evidence of postage is determined to be improper;

printing a receipt including data thereon corresponding to the envelope if the evidence of postage is determined to be proper, the receipt data includes a date/time stamp and an ID tracking number that uniquely corresponds to the envelope;

storing the receipt data in a memory device;

transferring the receipt data from the memory device to a postal interface; and transferring the receipt data from the postal interface to a postal data center using a portable data carrier.

6. The method of claim 5, further comprising the step(s) of:

including within the receipt data a terminal ID number that uniquely corresponds to a particular terminal that issued the receipt where the particular terminal is one of a plurality of remotely distributed terminals.

7. The method of claim 6, further comprising the step(s) of:

including within the receipt data an indicator of the class of service for the envelope.

8. The method of claim 7, further comprising the step(s) of:

including on the receipt an encoded version of at least a portion of the receipt data.

9. The method of claim 8, further comprising the step(s) of:

prior to receiving the envelope at the mail deposit terminal, generating the ID tracking number at a postage metering system and utilizing the postage metering system to print the ID tracking number on the envelope.

10. The method of claim 5, further comprising the step(s) of:

prior to receiving the envelope at the mail deposit terminal, generating the ID tracking number at a postage metering system and utilizing the postage metering system to print the ID trucking number on the envelope.

* * * * *